United States Patent
Vanier et al.

(10) Patent No.: US 6,770,705 B2
(45) Date of Patent: Aug. 3, 2004

(54) CURABLE FILM-FORMING COMPOSITION EXHIBITING IMPROVED IMPACT STRENGTH AND CHIP RESISTANCE

(75) Inventors: Noel R. Vanier, Wexford, PA (US); Calum H. Munro, Wexford, PA (US); Gregory J. McCollum, Gibsonia, PA (US); James B. O'Dwyer, Valencia, PA (US); Cynthia Kutchko, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/361,096

(22) Filed: Feb. 6, 2003

(65) Prior Publication Data

US 2003/0162876 A1 Aug. 28, 2003

Related U.S. Application Data

(60) Provisional application No. 60/358,280, filed on Feb. 20, 2002.

(51) Int. Cl.$^7$ .............................................. C08F 216/04
(52) U.S. Cl. ....................... 524/560; 524/570; 524/493; 524/437; 524/438; 524/492; 525/526.1
(58) Field of Search ................................. 524/493, 437, 524/438, 492, 560, 570; 525/526.1

(56) References Cited

U.S. PATENT DOCUMENTS

| | | | |
|---|---|---|---|
| 4,522,958 A | 6/1985 | Das et al. | 523/212 |
| 4,526,910 A | 7/1985 | Das et al. | 523/220 |
| 4,652,470 A | 3/1987 | Das et al. | 427/407.1 |
| 4,677,004 A | 6/1987 | Das et al. | 427/407.1 |
| 5,749,937 A | 5/1998 | Detering et al. | 75/10.19 |
| 5,853,809 A * | 12/1998 | Campbell et al. | 427/407.1 |
| 6,103,387 A * | 8/2000 | Yamamoto et al. | 428/482 |

FOREIGN PATENT DOCUMENTS

| | | | |
|---|---|---|---|
| CA | 2127814 | 1/1995 | C09D/7/12 |
| EP | 0 832 947 A2 | 4/1998 | C09D/7/12 |
| JP | 59-043071 | 3/1984 | |
| JP | 5-15533 | 3/1993 | |

* cited by examiner

Primary Examiner—David W. Wu
Assistant Examiner—Satya B Sastri
(74) Attorney, Agent, or Firm—William J. Uhl

(57) ABSTRACT

A curable film-forming composition is provided comprising in a medium (i) 10 to 90 percent by weight based on the total weight of solids in the film-forming composition of a crosslinking agent; (ii) 10 to 90 percent by weight based on the total weight of solids in the film-forming composition of a polymer containing a plurality of functional groups reactive with the crosslinking agent; and (iii) at least 20 percent by volume based on the total volume of the film-forming composition of particles having a mean particle size less than 100 nm. A cured composition comprising the crosslinking agent of (i) and the polymer of (ii) has a cured softening point of less than 30° C. The particles of component (iii) further have a hardness value greater than 5 on the Moh hardness scale, and have an affinity for the medium sufficient to keep the particles suspended therein. The affinity of the particles for the medium is greater than the affinity of the particles for each other, thereby preventing agglomeration of the particles within the medium.

Cured compositions having a film thickness of at least 5 microns demonstrate excellent chip resistance, superior sandability and resistance to scratching, water spotting and acid etch.

17 Claims, No Drawings

CURABLE FILM-FORMING COMPOSITION EXHIBITING IMPROVED IMPACT STRENGTH AND CHIP RESISTANCE

CROSS-REFERENCE TO RELATED APPLICATION

This application claims priority under 35 U.S.C. §119 to Provisional Application Serial No. 60/358,280, filed Feb. 20, 2002.

FIELD OF THE INVENTION

The present invention relates to novel curable film-forming compositions containing submicron-sized particles and having improved chip resistance.

BACKGROUND OF THE INVENTION

Substrates coated with film-forming compositions, particularly those used in automotive applications, are subject to surface defects that occur during the assembly process as well as damage from numerous environmental elements. Such defects incurred during the assembly process include paint defects in the application or curing of the various coating layers. Damaging environmental elements include acidic precipitation, exposure to ultraviolet radiation from sunlight, high relative humidity and high temperatures, defects due to contact with objects causing scratching of the coated surface, and defects due to impact with small, hard objects resulting in chipping of the coating surface.

Typically, a harder, more highly crosslinked film may exhibit improved scratch resistance, but it is less flexible and much more susceptible to chipping and/or thermal cracking due to embrittlement of the film resulting from a high crosslink density. A softer, less crosslinked film, while not prone to chipping or thermal cracking, is susceptible to scratching, waterspotting, and acid etch due to a low crosslink density of the cured film.

A spray-applied chip resistant coating layer is often present in multi-layered coating composites for motor vehicles. The chip resistant layer protects the surface of the substrates from losing paint through chipping during manufacturing and when the vehicle is hit with solid debris, such as gravel and stones. The art for achieving chip resistance from spray applied primer coatings has postulated that reducing the differential in impact energy between the multiple coating layers should improve chip resistance of the coating. This is especially applicable when coating layers have excessive difference of hardness between them. This reduction in the differential would lessen delamination between the coatings, such as between an undercoat and an intermediate coat or between a topcoat and an intermediate coat.

Prior art attempts to improve the chip resistance of coatings have included the addition of hard micron- and submicron-sized particles such as colloidal silica to relatively soft resinous compositions. Japanese Kokai Number Hei 5-15533 discloses a coating composition comprising an alkyd resin and aminoplast crosslinking agent, to which is added ultrafine particles of silica. Such particles typically have highly active (and reactive) surfaces, often due to surface treatments, and as a result the particles tend to agglomerate during production thereof or during incorporation into the coating composition. Agglomeration of the particles prevents high loading of the particles into a coating composition because the viscosity of the composition increases unacceptably. Additionally, agglomeration of the particles may affect the optical properties of the coating, reducing the gloss and clarity thereof because of light scattering.

It would be desirable to provide a chip resistant curable film-forming composition using novel particle technology without detrimentally affecting appearance properties of the composition.

SUMMARY OF THE INVENTION

In accordance with the present invention, a curable film-forming composition is provided comprising in a medium (i) 10 to 90 percent by weight based on the total weight of solids in the film-forming composition of a crosslinking agent; (ii) 10 to 90 percent by weight based on the total weight of solids in the film-forming composition of a polymer containing a plurality of functional groups reactive with the crosslinking agent; and (iii) at least 20 percent by volume based on the total volume of the film-forming composition of particles having a mean particle size less than 100 nm. A cured composition comprising the crosslinking agent of (i) and the polymer of (ii) has a cured softening point of less than 30° C. The particles of component (iii) further have a hardness value greater than 5 on the Moh hardness scale, and have an affinity for the medium sufficient to keep the particles suspended therein. The affinity of the particles for the medium is greater than the affinity of the particles for each other, thereby preventing agglomeration of the particles within the medium.

Also provided is a coated substrate comprising a substrate on which the curable film-forming compositions described above are applied and cured to form a cured coating; the cured coating having a thickness of at least 5 microns. The coating shows excellent chip resistance, superior sandability and resistance to scratching, water spotting and acid etch.

DETAILED DESCRIPTION

Other than in any operating examples, or where otherwise indicated, all numbers expressing quantities of ingredients, reaction conditions and so forth used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Film-forming compositions of the present invention comprise 10 to 90 percent by weight of a crosslinking agent as component (i). Examples of suitable crosslinking agents include any known crosslinking agents useful in liquid curable film-forming compositions such as aminoplasts, polycarboxylic acids and anhydrides, polyisocyanates, polyols, and polyepoxides.

Aminoplasts are obtained from the reaction of formaldehyde with an amine or amide. The most common amines or amides are melamine, urea, or benzoguanamine. However, condensates with other amines or amides can be used. While the aldehyde used is most often formaldehyde, other aldehydes such as acetaldehyde, crotonaldehyde, and benzaldehyde may be used.

The aminoplast contains methylol groups and usually at least a portion of these groups are etherified with an alcohol to modify the cure response. Any monohydric alcohol may be employed for this purpose including methanol, ethanol, and isomers of butanol and hexanol.

Most often, the aminoplasts are melamine-, urea-, or benzoguanamine-formaldehyde condensates etherified with an alcohol containing from one to four carbon atoms.

Examples of polycarboxylic acids that are suitable for use as the crosslinking agent (i) in the composition of the present invention include those described in U.S. Pat. No. 4,681,811, at column 6, line 45 to column 9, line 54. Suitable polyanhydrides include those disclosed in U.S. Pat. No. 4,798,746, at column 10, lines 16–50, and in U.S. Pat. No. 4,732,790, at column 3, lines 41 to 57.

Polyisocyanate crosslinking agents may be used in the composition of the present invention and are typically at least partially capped. Usually the polyisocyanate crosslinking agent is a fully capped polyisocyanate with substantially no free isocyanate groups. The polyisocyanate can be an aliphatic or an aromatic polyisocyanate or a mixture of the two. Diisocyanates are preferred, although higher polyisocyanates can be used in place of or in combination with diisocyanates.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates include 4,4'-diphenylmethane diisocyanate and toluene diisocyanate. Examples of suitable aralkyl diisocyanates are meta-xylylene diisocyanate and $\alpha,\alpha,\alpha',\alpha'$-tetramethylmeta-xylylene diisocyanate.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used.

Any suitable aliphatic, cycloaliphatic, or aromatic alkyl monoalcohol or phenolic compound may be used as a capping agent for the polyisocyanate. Examples include lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Diethylene glycol butyl ether is preferred among the glycol ethers.

Other suitable capping agents include oximes such as methyl ethyl ketoxime, acetone oxime and cyclohexanone oxime, lactams such as epsilon-caprolactam, and secondary amines such as dibutyl amine.

Polyols may be used as crosslinking agents for anhydride functional polymers and include those disclosed in U.S. Pat. No. 4,046,729, at column 7, line 52 to column 8, line 9; column 8, line 29 to column 9, line 66; and in U.S. Pat. No. 3,919,315, at column 2, line 64 to column 3, line 33.

Polyepoxides may be used as crosslinking agents for carboxylic acid functional polymers and include those described in U.S. Pat. No. 4,681,811, at column 5, lines 33–58.

The crosslinking agent (i) typically is present in the curable film-forming composition of the present invention in an amount ranging from at least 10 percent by weight, preferably at least 25 percent by weight, based on the total weight of resin solids in the film-forming composition. The crosslinking agent (i) also typically is present in the curable film-forming composition of the present invention in an amount less than 90 percent by weight, preferably less than 75 percent by weight, based on the total weight of resin solids in the curable film-forming composition. The amount of crosslinking agent (i) present in the curable film-forming composition of the present invention can range between any combination of these values inclusive of the recited values.

Film-forming compositions of the present invention further comprise 10 to 90 percent by weight of a polymer as component (ii), containing a plurality of functional groups reactive with the crosslinking agent (i). The polymers that can be used as component (ii) in the film-forming composition of the present invention may be selected from at least one of acrylic, polyester, polyurethane and polyether polymers. Note that by "polymers" is meant polymeric materials, oligomeric materials, copolymers, and homopolymers of various monomers. The polymers contain a plurality of functional groups that are reactive with the crosslinking agent of (i), for example hydroxyl, carboxyl, carbamate, epoxy and/or amide functional groups.

Suitable functional group-containing acrylic polymers include those prepared from one or more alkyl esters of acrylic acid or methacrylic acid and, optionally, one or more other polymerizable ethylenically unsaturated monomers. Suitable alkyl esters of acrylic or methacrylic acid include methyl methacrylate, ethyl methacrylate, butyl methacrylate, ethyl acrylate, butyl acrylate and 2-ethylhexyl acrylate. Ethylenically unsaturated carboxylic acid functional monomers, for example acrylic acid and/or methacrylic acid or anhydride, can also be used when a carboxylic acid functional acrylic polymer is desired. Amide functional acrylic polymers can be formed by polymerizing ethylenically unsaturated acrylamide monomers, such as N-butoxymethyl acrylamide and N-butoxyethyl acrylamide with other polymerizable ethylenically unsaturated monomers. Non-limiting examples of suitable other polymerizable ethylenically unsaturated monomers include vinyl aromatic compounds, such as styrene and vinyl toluene; nitriles, such as acrylonitrile and methacrylonitrile; vinyl and vinylidene halides, such as vinyl chloride and vinylidene fluoride and vinyl esters, such as vinyl acetate; olefins, such as isobutylene and diisobutylene.

The acrylic polymers may contain hydroxyl functionality which can be incorporated into the acrylic polymer through the use of hydroxyl functional monomers such as hydroxyethyl acrylate, hydroxypropyl acrylate, hydroxyethyl methacrylate and hydroxypropyl methacrylate which may be copolymerized with the other acrylic monomers mentioned above.

The acrylic polymer can be prepared from ethylenically unsaturated, beta-hydroxy ester functional monomers. Such monomers are derived from the reaction of an ethylenically unsaturated acid functional monomer, such as monocarboxylic acids, for example, acrylic acid, and an epoxy compound which does not participate in the free radical initiated polymerization with the unsaturated acid monomer. Examples of such epoxy compounds are glycidyl ethers and esters. Suitable glycidyl ethers include glycidyl ethers of alcohols and phenols, such as butyl glycidyl ether, octyl glycidyl ether, phenyl glycidyl ether and the like. Suitable glycidyl esters include those commercially available from Shell Chemical Company under the trademark CARDURA® E; and from Exxon Chemical Company under the trademark GLYDEXX®-10.

Alternatively, the beta-hydroxy ester functional monomers are prepared from an ethylenically unsaturated, epoxy functional monomer, for example glycidyl methacrylate and allyl glycidyl ether, and a saturated carboxylic acid, such as a saturated monocarboxylic acid, for example, isostearic acid. The acrylic polymer is typically prepared by solution polymerization techniques in the presence of suitable initiators such as organic peroxides or azo compounds, for example, benzoyl peroxide or N,N-azobis(isobutyronitrile). The polymerization can be carried out in an organic solution in which the monomers are soluble by techniques conventional in the art.

Pendent and/or terminal carbamate functional groups can be incorporated into the acrylic polymer by copolymerizing the acrylic monomer with a carbamate functional vinyl monomer, such as a carbamate functional alkyl ester of methacrylic acid. These carbamate functional alkyl esters are prepared by reacting, for example, a hydroxyalkyl carbamate, such as the reaction product of ammonia and ethylene carbonate or propylene carbonate, with methacrylic anhydride. Other carbamate functional vinyl monomers can include the reaction product of hydroxyethyl methacrylate, isophorone diisocyanate and hydroxypropyl carbamate. Still other carbamate functional vinyl monomers may be used, such as the reaction product of isocyanic acid (HNCO) with a hydroxyl functional acrylic or methacrylic monomer such as hydroxyethyl acrylate, and those carbamate functional vinyl monomers described in U.S. Pat. No. 3,479,328.

Carbamate groups can also be incorporated into the acrylic polymer by a "transcarbamoylation" reaction in which a hydroxyl functional acrylic polymer is reacted with a low molecular weight carbamate derived from an alcohol or a glycol ether. The carbamate groups exchange with the hydroxyl groups yielding the carbamate functional acrylic polymer and the original alcohol or glycol ether.

The low molecular weight carbamate functional material derived from an alcohol or glycol ether is first prepared by reacting the alcohol or glycol ether with urea in the presence of a catalyst such as butyl stannoic acid. Suitable alcohols include lower molecular weight aliphatic, cycloaliphatic and aromatic alcohols, such as methanol, ethanol, propanol, butanol, cyclohexanol, 2-ethylhexanol and 3-methylbutanol. Suitable glycol ethers include ethylene glycol methyl ether and propylene glycol methyl ether. Propylene glycol methyl ether is preferred.

Also, hydroxyl functional acrylic polymers can be reacted with isocyanic acid yielding pendent carbamate groups. Note that the production of isocyanic acid is disclosed in U.S. Pat. No. 4,364,913. Likewise, hydroxyl functional acrylic polymers can be reacted with urea to give an acrylic polymer with pendent carbamate groups.

Epoxide functional acrylic polymers are typically prepared by polymerizing one or more epoxide functional ethylenically unsaturated monomers, e.g., glycidyl (meth)acrylate and allyl glycidyl ether, with one or more ethylenically unsaturated monomers that are free of epoxide functionality, e.g., methyl (meth)acrylate, isobornyl (meth)acrylate, butyl (meth)acrylate and styrene. Examples of epoxide functional ethylenically unsaturated monomers that may be used in the preparation of epoxide functional acrylic polymers include, but are not limited to, glycidyl (meth)acrylate, 3,4-epoxycyclohexylmethyl (meth)acrylate, 2-(3,4-epoxycyclohexyl)ethyl (meth)acrylate and allyl glycidyl ether. Examples of ethylenically unsaturated monomers that are free of epoxide functionality include those described above as well as those described in U.S. Pat. No. 5,407,707 at column 2, lines 17 through 56, which disclosure is incorporated herein by reference. In one embodiment of the present invention, the epoxide functional acrylic polymer is prepared from a majority of (meth)acrylate monomers.

The functional group-containing acrylic polymer typically has a $M_n$ ranging from 500 to 30,000 and preferably from 1000 to 5000. The acrylic polymer typically has a calculated functional group equivalent weight typically within the range of 15 to 150, and preferably less than 50, based on equivalents of reactive functional groups.

Non-limiting examples of functional group-containing polyester polymers suitable for use as the polymer (ii) in the curable film-forming composition of the present invention can include linear or branched polyesters having hydroxyl, carboxyl, anhydride, epoxy and/or carbamate functionality. Such polyester polymers are generally prepared by the polyesterification of a polycarboxylic acid or anhydride thereof with polyols and/or an epoxide using techniques known to those skilled in the art. Usually, the polycarboxylic acids and polyols are aliphatic or aromatic dibasic acids and diols. Transesterification of polycarboxylic acid esters using conventional techniques is also possible.

The polyols which usually are employed in making the polyester (or the polyurethane polymer, as described below) include alkylene glycols, such as ethylene glycol and other diols, such as neopentyl glycol, hydrogenated Bisphenol A, cyclohexanediol, butyl ethyl propane diol, trimethyl pentane diol, cyclohexanedimethanol, caprolactonediol, for example, the reaction product of epsilon-caprolactone and ethylene glycol, hydroxy-alkylated bisphenols, polyether glycols, for example, poly(oxytetramethylene) glycol and the like. Polyols of higher functionality may also be used. Examples include trimethylolpropane, trimethylolethane, pentaerythritol, tris-hydroxyethylisocyanurate and the like.

The acid component used to prepare the polyester polymer can include, primarily, monomeric carboxylic acids or anhydrides thereof having 2 to 18 carbon atoms per molecule. Among the acids which are useful are cycloaliphatic acids and anhydrides, such as phthalic acid, isophthalic acid, terephthalic acid, tetrahydrophthalic acid, hexahydrophthalic acid, methylhexahydrophthalic acid, 1,3-cyclohexane dicarboxylic acid and 1,4-cyclohexane dicarboxylic acid. Other suitable acids include adipic acid, azelaic acid, sebacic acid, maleic acid, glutaric acid, decanoic diacid, dodecanoic diacid and other dicarboxylic acids of various types. The polyester may include minor amounts of monobasic acids such as benzoic acid, stearic acid, acetic acid and oleic acid. Also, there may be employed higher carboxylic acids, such as trimellitic acid and tricarballylic acid. Where acids are referred to above, it is understood that anhydrides thereof which exist may be used in place of the acid. Also, lower alkyl esters of diacids such as dimethyl glutarate and dimethyl terephthalate can be used.

Pendent and/or terminal carbamate functional groups may be incorporated into the polyester by first forming a hydroxyalkyl carbamate which can be reacted with the polyacids and polyols used in forming the polyester. The hydroxyalkyl carbamate is condensed with acid functionality on the polyester yielding carbamate functionality. Carbamate functional groups may also be incorporated into the polyester by reacting a hydroxyl functional polyester with a low molecular weight carbamate functional material via a transcarbamoylation process similar to the one described above in connection with the incorporation of carbamate groups into the acrylic polymers or by reacting isocyanic acid with a hydroxyl functional polyester.

Epoxide functional polyesters can be prepared by art-recognized methods, which typically include first preparing a hydroxy functional polyester that is then reacted with epichlorohydrin. Polyesters having hydroxy functionality may be prepared by art-recognized methods, which include reacting carboxylic acids (and/or esters thereof) having acid (or ester) functionalities of at least 2, and polyols having hydroxy functionalities of at least 2. As is known to those of ordinary skill in the art, the molar equivalents ratio of carboxylic acid groups to hydroxy groups of the reactants is selected such that the resulting polyester has hydroxy functionality and the desired molecular weight.

Amide functionality may be introduced to the polyester polymer by using suitably functional reactants in the preparation of the polymer, or by converting other functional groups to amido-groups using techniques known to those skilled in the art. Likewise, other functional groups may be incorporated as desired using suitably functional reactants if available or conversion reactions as necessary. The functional group-containing polyester polymer typically has a $M_n$ ranging from 500 to 30,000, preferably about 1000 to 5000. The polyester polymer typically has a calculated functional group equivalent weight within the range of 15 to 150, preferably 20 to 75, based on equivalents of reactive pendent or terminal functional groups.

Non-limiting examples of suitable polyurethane polymers having pendent and/or terminal functional groups include the polymeric reaction products of polyols, which are prepared by reacting the polyester polyols or acrylic polyols, such as those mentioned above or polyether polyols, such as those mentioned below, with a polyisocyanate such that the OH/NCO equivalent ratio is greater than 1:1 and free hydroxyl groups are present in the product. Alternatively, isocyanate functional polyurethanes may be prepared using similar reactants in relative amounts such that the OH/NCO equivalent ratio is less than 1:1. Such reactions employ typical conditions for urethane formation, for example, temperatures of 60° C. to 90° C. and up to ambient pressure, as known to those skilled in the art.

The organic polyisocyanates which can be used to prepare the functional group-containing polyurethane polymer include one or more aliphatic or aromatic diisocyanates or higher polyisocyanates.

Examples of suitable aromatic diisocyanates include 4,4'-diphenylmethane diisocyanate and toluene diisocyanate. Examples of suitable aliphatic diisocyanates include straight chain aliphatic diisocyanates, such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates include 1,2,4-benzene triisocyanate and polymethylene polyphenyl isocyanate.

Terminal and/or pendent carbamate functional groups can be incorporated into the polyurethane by reacting a polyisocyanate with a polyester polyol containing the terminal/pendent carbamate groups. Alternatively, carbamate functional groups can be incorporated into the polyurethane by reacting a polyisocyanate with a polyester polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer. Additionally, an isocyanate functional polyurethane can be reacted with a hydroxyalkyl carbamate to yield a carbamate functional polyurethane.

Amide functionality may be introduced to the polyurethane polymer by using suitably functional reactants in the preparation of the polymer, or by converting other functional groups to amido-groups using techniques known to those skilled in the art. Likewise, other functional groups may be incorporated as desired using suitably functional reactants if available or conversion reactions as necessary.

The functional group-containing polyurethane polymers typically have a $M_n$ ranging from 500 to 20,000, preferably from 1000 to 5000. The polyurethane polymer typically has a functional equivalent weight within the range of 15 to 150, preferably 20 to 75, based on equivalents of reactive pendent or terminal functional groups.

Non-limiting examples of functional group-containing polyether polymers suitable for use as the polymer (ii) in the curable film-forming composition of the present invention can include linear or branched polyethers having hydroxyl, epoxy and/or carbamate functionality.

Examples of polyether polyols are polyalkylene ether polyols which include those having the following structural formulae (I) and (II):

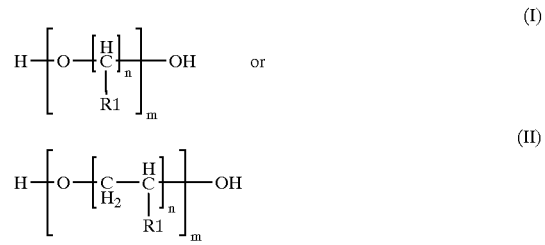

where the substituent R1 is hydrogen or lower alkyl containing from 1 to 5 carbon atoms including mixed substituents, n is typically from 2 to 6, and m is from 8 to 100 or higher. Note that the hydroxyl groups, as shown in structures (I) and (II) above, are terminal to the molecules. Included are poly(oxytetramethylene) glycols, poly(oxytetraethylene) glycols, poly(oxy-1,2-propylene) glycols and poly(oxy-1,2-butylene) glycols.

Also useful are polyether polyols formed from oxyalkylation of various polyols, for example, diols, such as ethylene glycol, 1,6-hexanediol, Bisphenol A and the like, or other higher polyols, such as trimethylolpropane, pentaerythritol and the like. Polyols of higher functionality which can be utilized as indicated can be made, for instance, by oxyalkylation of compounds, such as sucrose or sorbitol. One commonly utilized oxyalkylation method is reaction of a polyol with an alkylene oxide, for example, propylene or ethylene oxide, in the presence of a conventional acidic or basic catalyst as known to those skilled in the art. Typical oxyalkylation reaction conditions may be employed. Preferred polyethers include those sold under the names TER-ATHANE® and TERACOL®, available from E. I. Du Pont de Nemours and Company, Inc. and POLYMEG®, available from Q O Chemicals, Inc., a subsidiary of Great Lakes Chemical Corp.

Suitable carbamate functional polyether polymers can be prepared by reacting a polyether polyol with urea under reaction conditions well known to those skilled in the art. More preferably, the polyether polymer is prepared by a transcarbamoylation reaction similar to the reaction described above in connection with the incorporation of carbamate groups into the acrylic polymers.

Epoxide functional polyethers can be prepared from a hydroxy functional monomer, e.g., a diol, and an epoxide functional monomer, and/or a monomer having both hydroxy and epoxide functionality. Suitable epoxide functional polyethers include, but are not limited to, those based on 4,4'-isopropylidenediphenol (Bisphenol A), a specific example of which is EPON® RESIN 2002 available commercially from Shell Chemicals.

Amide functionality may be introduced to the polyether polymer by using suitably functional reactants in the preparation of the polymer, or by converting other functional groups to amido-groups using techniques known to those skilled in the art. Likewise, other functional groups may be incorporated as desired using suitably functional reactants if available or conversion reactions as necessary.

Suitable functional group-containing polyether polymers preferably have a number average molecular weight (Mn) ranging from 500 to 30,000 and more preferably from 1000 to 5000. The polyether polymers have a functional equivalent weight of within the range of 15 to 150, preferably 25 to 75, based on equivalents of reactive pendent and/or terminal functional groups and the solids of the polyether polymer.

The functional group-containing polymer (ii) typically is present in the curable film-forming composition of the present invention in an amount ranging from at least 10 percent by weight, preferably at least 25 percent by weight, based on the total weight of resin solids in the film-forming composition. The functional group-containing polymer (ii) also typically is present in the curable film-forming composition of the present invention in an amount less than 90 percent by weight, preferably less than 75 percent by weight, based on the total weight of resin solids in the coating composition. The amount of the functional group-containing polymer (ii) present in the curable film-forming composition of the present invention can range between any combination of these values inclusive of the recited values.

A cured composition comprising the crosslinking agent of (i) and the polymer of (ii) has a cured softening point of less than 30° C., typically less than 0° C., often less than −20° C. By "cured softening point" is meant the softening point of a cured material of about 1 to 2 mils (25.4 to 50.8 microns) in thickness as measured by the following procedure. The material in which the softening point is to be measured is applied in two coats with a ninety second 75° F. flash between coats to a steel substrate coated with corrosion resistant primer and base coat. The coating is allowed to air flash at 75° F. for fifteen minutes before baking at 275° F. for thirty minutes to cure. The coated substrate is heated with a thermal mechanical analyzer, such as a Perkin-Elmer TMS-2, from −25° C. to 150° C. at a heating rate of 10° C./minute. A penetration probe having a hemispherical tip with a diameter of about 0.089 cm and a net load of 5 grams is applied. A cured softening point temperature is the mean value of at least three separately determined temperatures at which there is a deflection from the baseline in a plot of indentation versus temperature.

The curable film-forming composition of the present invention further comprises (iii) sub-micron sized particles present in an amount of at least 20 percent by volume based on the total volume of the film-forming composition. The particles typically have a mean particle size less than 100 nm, often less than 50 nm, more often less than 20 nm. The average particle size can be determined by visually examining a micrograph of a transmission electron microscopy ("TEM") image, measuring the diameter of the particles in the image, and calculating the average particle size based on the magnification of the TEM image. One of ordinary skill in the art will understand how to prepare such a TEM image and determine particle size based on the magnification. The diameter of the particle refers to the smallest diameter sphere that will completely enclose the particle.

It will be recognized by one skilled in the art that mixtures of one or more particles having different average particle sizes can be incorporated into the compositions in accordance with the present invention to impart the desired properties and characteristics to the compositions. For example, particles of varying particle sizes can be used in the compositions according to the present invention. When the particle size distribution is substantially bimodal, particles are typically present in an amount up to 85 percent by volume based on the total volume of the film-forming composition. When the particle size distribution is substantially monodisperse, particles are typically present in an amount up to 75 percent by volume based on the total volume of the film-forming composition.

In one embodiment of the present invention, the particles have a hardness value greater than the hardness value of materials that can abrade or chip a polymeric coating or a polymeric substrate. Examples of materials that can chip the polymeric coating include, but are not limited to, dirt, sand, rocks, glass, and the like. The hardness values of the particles and the materials that can chip the polymeric coating can be determined by any conventional hardness measurement method, such as Vickers or Brinell hardness, but is preferably determined according to the original Mohs' hardness scale which indicates the relative scratch resistance of the surface of a material on a scale of one to ten.

The Mohs' hardness value of the particles is typically greater than 5. In certain embodiments, the Mohs' hardness value of the particles is greater than 6.

In one embodiment of the invention, the particles (iii) further have an index of refraction (n) that is greater than or less than that of the mixture of crosslinking agent (i) and polymer (ii) by an amount less than $\Delta n_{max}$, defined below.

$\Delta n_{max}$, the maximum difference in refractive index between the particles (iii) and the mixture of crosslinking agent (i) and polymer (ii), is dependent on the size (diameter, d) in nm of the particles (iii) and is determined according to the equation:

$$\Delta n_{max} = H/d^2$$

where H is an allowable haze factor.

For a film-forming composition that is substantially free from haze, H should be less than 200, preferably less than 133, more preferably less than 41. For example, if the size (d) of particles (iii) is 20 nm, $\Delta n_{max}$ is preferably less than 0.333, more preferably less than 0.103, while if the size (d) of particles (iii) is 75 nm, $\Delta n_{max}$ is preferably less than 0.024, more preferably less than 0.007.

Typically the refractive index of the particles ranges between 1.45 and 1.80. The particles are also substantially colorless. Such optical properties allow for the use of the particles in film-forming compositions, particularly clear film-forming compositions, without affecting the gloss or transparency thereof. Therefore, the composition is particularly suitable for use in applications requiring excellent appearance properties, such as in automotive applications.

The particles have an affinity for the medium of the composition sufficient to keep the particles suspended therein. The affinity of the particles for the medium is greater than the affinity of the particles for each other, thereby preventing agglomeration of the particles within the medium. Not intending to be bound by any theory, it is believed that the particles are discrete; i. e., they are each surrounded by solvent medium prior to curing and are not substantially in contact with one another. Upon curing, it is believed that the particles are each substantially surrounded by resin matrix, thereby enhancing the impact resistance of the cured coating.

The particles are prepared such that they are substantially free of functional groups, such as hydroxyl groups, on the particle surface. The particles are also substantially free of any surface treatment. Such characteristics distinguish the particles used in the composition of the present invention from conventional particles such as colloidal silica commonly used in the coatings industry. Conventional particles, which are usually surface treated and are highly surface active due to the presence of functional groups on the surface thereof, tend to agglomerate during their preparation or upon addition to a composition. For this reason, conventional particles such as colloidal silica need to be suspended in a liquid medium prior to addition to a coating composition. In contrast, the particles used in the composition of the present invention may be added to the composition neat during the formulation thereof, and may be added at high loadings without appreciable viscosity increases, allowing for formulation of high solids coating compositions.

The shape (or morphology) of the particles can vary depending upon the specific embodiment of the present invention and its intended application. For example, generally spherical morphologies can be used, as well as particles that are cubic, platy, or acicular (elongated or fibrous). In general, the particles are substantially spherical in shape.

The particles (iii) used in the composition of the present invention comprise one or more metal oxides. In one embodiment, the particles (iii) may be a complex metal oxide comprising a homogeneous mixture, or solid state solution of two or more (up to x) metal oxides, labeled MO1, MO2, . . . , MOx, having an effective refractive index ($n_{eff}$) that is closely approximated as a volume average of the refractive indices of the component metal oxides, determined according to the equation:

$$n_{eff} = (c_{MO1} \cdot n_{MO1}/\rho_{MO1}) + (c_{MO2} \cdot n_{MO2}/\rho_{MO2}) + \ldots + (c_{MOx} \cdot n_{MOx}/\rho_{MOx})$$

where $n_{MO1}, n_{MO2}, \ldots, n_{MOx}$ are the respective refractive indices of the metal oxides, MO1, MO2, . . . , MOx; $c_{MO1}, c_{MO2}, \ldots, c_{MOx}$ are the weight fractions of the metal oxides, MO1, MO2, . . . , MOx; and $\rho_{MO1}, \rho_{MO2}, \ldots, \rho_{MOx}$, are the respective densities of the metal oxides, MO1, MO2, . . . , MOx.

For example, amorphous silica has a refractive index of about 1.46 and a density of about 2.2, and alumina has a refractive index of about 1.76 and a density of about 4.0. A mixed metal oxide comprising 60 weight percent silica and 40 weight percent alumina would have an effective refractive index of approximately 1.54.

The metal oxides may be selected from at least one of aluminum oxide, zinc oxide, zirconium oxide and silicon dioxide. When the metal oxides are mixed; i. e., more than one type of metal oxide is used, they typically form a homogeneous mixture within the particle. The particles may further comprise one or more carbides such as silicon carbide; nitrides such as silicon nitride, aluminum nitride and boron nitride present at a total of up to 100 percent by weight, based on the total weight of the particles. The particles most often comprise 10 to 70 percent by weight aluminum oxide and 30 to 90 percent by weight silica.

The particles used in the film-forming composition of the invention may be prepared by reacting together the metal oxide precursors and any other ingredients in any of a variety of processes. The particles may be prepared by a process comprising: (a) introducing reactants into a reaction chamber; (b) rapidly heating the reactants by means of a plasma to a selected reaction temperature sufficient to yield a gaseous reaction product; (c) preferably passing the gaseous reaction product through a restrictive convergent-divergent nozzle to effect rapid cooling, or utilizing an alternative cooling method such as a cool surface or quenching gas, and (d) condensing the gaseous reaction product to yield ultrafine solid particles. One process for preparing the particles (iii) is fully described in U.S. Pat. No. 5,749,937. The process comprises: (a) introducing a reactant stream (in the case of the particles used in the composition of the present invention, comprising the one or more metal oxide precursors) into one axial end of a reaction chamber; (b) rapidly heating the reactant stream by means of a plasma to a selected reaction temperature as the reactant stream flows axially through the reaction chamber, yielding a gaseous reaction product; (c) passing the gaseous reaction product through a restrictive convergent-divergent nozzle arranged coaxially within the end of the reaction chamber to rapidly cool the gaseous reaction product adiabatically and isentropically as the gaseous reaction product flows through the nozzle, retaining a desired end product within the flowing gaseous stream; and (d) subsequently cooling and slowing the velocity of the desired end product exiting from the nozzle, yielding ultrafine solid particles.

Suitable reactants to be used as part of the reactant stream include zinc oxide, aluminum oxide, zirconium dioxide, silicon dioxide, boron oxide or hydride, nitrogen and methane. The reactant stream may be introduced to the reaction chamber as a solid, liquid, or gas, but is usually introduced as a solid.

Usually the film-forming composition will also preferably contain catalysts to accelerate the cure of the crosslinking agent (i) and polymer (ii). Suitable catalysts for aminoplast cure include acids such as acid phosphates and sulfonic acid or a substituted sulfonic acid. Examples include dodecylbenzene sulfonic acid, paratoluene sulfonic acid, and the like. Suitable catalysts for isocyanate cure include organotin compounds such as dibutyltin oxide, dioctyltin oxide, dibutyltin dilaurate, and the like. Suitable catalysts for other crosslinking agents may used when necessary as known to those skilled in the art. The catalyst is usually present in an amount of about 0.05 to about 5.0 percent by weight, preferably about 0.08 to about 2.0 percent by weight, based on the total weight of resin solids in the film-forming composition.

Optional ingredients such as, for example, plasticizers, surfactants, thixotropic agents, anti-gassing agents, organic cosolvents, flow controllers, anti-oxidants, UV light absorbers and similar additives conventional in the art may be included in the composition. These ingredients are typically present at up to 40% by weight based on the total weight of resin solids.

The composition of the present invention may optionally contain pigments to give it color. Suitable metallic pigments include in particular aluminum flake, copper bronze flake and metal oxide coated mica.

Besides the metallic pigments, the compositions may contain non-metallic color pigments conventionally used in surface coatings including inorganic pigments such as titanium dioxide, iron oxide, chromium oxide, lead chromate, and carbon black, and organic pigments such as phthalocyanine blue and phthalocyanine green. In general, the pigment is incorporated into the coating composition in amounts of about 1 to 80 percent by weight based on the total weight of coating solids. The metallic pigment is employed in amounts of about 0.5 to 25 percent by weight based on the total weight of coating solids.

The coating composition generally may be applied to a substrate by itself as a transparent or pigmented monocoat, as a primer, or as the pigmented base coat and/or transparent topcoat in a color-plus-clear composite coating as known to those skilled in the art.

The curable film-forming composition can be applied to various substrates to which it adheres. The composition can be applied by conventional means including brushing, dipping, flow coating, spraying and the like, but is most often applied by spraying. The usual spray techniques and equipment for air spraying and electrostatic spraying and either manual or automatic methods can be used.

The curable film-forming composition can be applied over virtually any substrate including wood, metals, glass, cloth plastic, foam, including elastomeric substrates and the like. It is particularly useful in applications over metals and elastomeric substrates that are found on motor vehicles.

After application of the composition to the substrate, a film is formed on the surface of the substrate by driving solvent, i. e., organic solvent or water, out of the film by heating or by an air-drying period. Suitable drying conditions will depend on the particular composition, but in general a drying time of from about 1 to 5 minutes at a temperature of about 80–250° F. (20–121° C.) will be adequate. More than one coating layer may be applied to develop the optimum appearance. Usually between coats, the previously applied coat is flashed; that is, exposed to ambient conditions for about 0.5 to 10 minutes. The thickness of the coating is usually from about 0.5–5 mils (12.7 to 127 microns), preferably 1.0–3 mils (25.4 to 76.2 microns). The coating composition is then heated to cure all coating layers. In the curing operation, solvents are driven off and the film-forming materials of the composition are crosslinked. The heating or curing operation is usually carried out at a temperature in the range of from 160–350° F. (71–177° C.) but if needed, lower or higher temperatures may be used as necessary to activate crosslinking mechanisms.

As used herein, the term "cure" as used in connection with a composition, e.g., "a curable composition", shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen. This method determines the glass transition temperature and crosslink density of free films of coatings or polymers. These physical properties of a cured material are related to the structure of the crosslinked network.

According to this method, the length, width, and thickness of a sample to be analyzed are first measured, the sample is tightly mounted to the Polymer Laboratories MK III apparatus, and the dimensional measurements are entered into the apparatus. A thermal scan is run at a heating rate of 3° C./min, a frequency of 1 Hz, a strain of 120%, and a static force of 0.01N, and sample measurements occur every two seconds. The mode of deformation, glass transition temperature, and crosslink density of the sample can be determined according to this method. Higher crosslink density valves indicate a higher degree of crosslinking in the coating.

The coating compositions of the present invention have excellent chip resistance properties. Impact resistance is significantly improved through the use of the curable film-forming compositions of the present invention, whether as a monocoat, primer, or as a base coat and/or clear coat in a color-plus-clear composite coating. A coated substrate on which the curable film-forming composition is applied and cured to form a cured coating, having a film thickness of at least 5 microns, typically has excellent chip resistance. The coating additionally shows superior sandability and resistance to scratching, water spotting and acid etch when compared to a similar cured coating without the particles.

The determination of chip resistance of a coating may be performed using test method SAE J400, wherein small gravel stones are fired under a pressure of 60 to 70 psi at a 90° incidence angle, onto coated panels that have been chilled overnight at −30° F. The test is conducted in a Gravelometer® testing machine, supplied by Q-Panel Company. Panels are rated visually on a scale of 1 to 10, with larger numbers indicating less chipping.

EXAMPLE I

A. Preparation of Chip Resistant Primer Coating Composition

| Ingredients | Parts by Weight (grams) |
| --- | --- |
| Acrylic Copolymer[1] | 80.00 |
| Aluminum Silicate[2] | 31.50 |
| | (20.6% by volume; about 7.5 Moh hardness |
| Solsperse 32500[3] | 0.32 |
| Cymel 1158[4] | 8.00 |

[1]This Acrylic Copolymer having an acid number of 20.31 and a hydroxyl number of 402.8 was prepared from isobutylene, butyl acrylate, hydroxyethyl acrylate, acrylic acid and styrene (8.9:3.3:5.2:0.8:4.0 molar ratio) reduced to 55% solids with n-butanol.
[2]The Aluminum Silicate powder was obtained from NanoProducts, Longmont, CO, USA, (specific surface area (BET) of 32.1 m2/g, calculated equivalent spherical diameter of 74 nm). This average particle diameter was confirmed by TEM analysis. This aluminum silicate was then sifted into the Acrylic Copolymer containing the Solsperse 32500 using a Cowles blade to mix. Once all of the Aluminum Silicate was added; the mixture was set on high speed for 15 minutes. The blade was then changed to a flat blade and ceramic media was added to the mixture and it was subjected to high speed agitation for 1 ½ hours. This material was then reduced to 55% solids with n-butanol.
[3]Solsperse 32500 dispersant is commercially available from Avecia.
[4]Melamine formaldehyde crosslinking agent is commercially available from Cytec Industries.

The chip resistant primer was prepared by adding the Cymel 1158 reduced to 55% solids with n-butanol to the Aluminum Silicate dispersion. The nanoparticles were suspended in the coating composition and did not agglomerate while the coating composition was being evaluated. This material was applied to steel panels primed with ED5051 electrodeposition primer from PPG Industries by using a #38 wire wound draw down bar and baked for 30 minutes at 150° C.

The Copolymer and Cymel 1158 (chip resistant primer without aluminum silicate and Solsperse 32500) was applied to ED5051 primed panels and processed under the conditions described above. The Cured test panels (2) were evaluated for softening point.

The instrument used for the softening point analysis was a TMA2940. The test conditions were at a heating rate of 10° C./minute from −50° C. to 200° C. using the semi-hemispherical probe with 0.1 N force obtaining a cured softening point of 27.29 based on an average of two values.

The cured primer panels with and without the aluminum silicate were coated with a Silver Metallic Basecoat ODCT-6505 and a High Solids Clearcoat DCT-8000, both available from PPG Industries.

The determination of chip resistance of these panels was conducted using a Gravelometer® testing machine, supplied by Q-panel Company. The small gravel stones were fired under a pressure of 70 psi at a 90° incidence angle, onto the coated panels that were chilled overnight at −30° F.

The coating containing the aluminum silicate clearly showed a significant improvement in chip resistance.

We claim:

1. A curable film-forming composition comprising in a medium (i) 10 to 90 percent by weight based on the total weight of solids in the film-forming composition of a crosslinking agent; (ii) 10 to 90 percent by weigh based on the total weight of solids in the film-forming composition of a polymer containing a plurality of functional groups reactive with the crosslinking agent; and (iii) at least 20 percent by volume based on the total volume of the film-forming composition of particles having a mean particle size less than 100 nm, having a hardness value greater than 5 on the Moh hardness scale, wherein the particles are substantially free of hydroxyl functional groups on the particle surface and the particles are substantially free of surface treatment, whereby the particles have an affinity for the medium sufficient to keep the particles suspended therein, said affinity of the particles for the medium being greater than the affinity of the particles for each other, thereby preventing agglomeration of the particles within the medium; and wherein a cured composition comprising the crosslinking agent of (i) and the polymer of (ii) has a cured softening point of less than 30° C.

2. The film-forming composition of claim 1 wherein the polymer is present in the film-forming composition in amounts of 25 to 75 percent by weight, based on the total weight of solids in the film-forming composition.

3. The film-forming composition of claim 1 wherein the crosslinking agent is present in the film-forming composition in amounts of 25 to 75 percent by weight, based on the total weight of solids in the film-forming composition.

4. The film-forming composition of claim 1 wherein the particles are present in the film-forming composition in amounts of 20 to 70 percent by volume, based on the total volume of the film-forming composition.

5. The film-forming composition of claim 1 wherein the particles comprise 10 to 70 percent by weight, based on the total weight of the particles, ALUMINUM OXIDE and 30 to 90 percent by weight, based on the total weight of the particles, silica.

6. The film-forming composition of claim 1 wherein the particles (iii) have an index of refraction (n) that is greater than or less than that of the mixture of crosslinking agent (i) and polymer (ii) by an amount less than $\Delta n_{max1}$ wherein $\Delta n_{max}$ is determined by the equation:

$$\Delta n_{max} = H/d^2$$

wherein H is an allowable haze factor and is less than 200, and d is the mean particle size of the particles (iii) in nanometers.

7. The film-forming composition of claim 6 wherein H is less than 133.

8. The film-forming composition of claim 7 wherein H is less than 41.

9. The film-forming composition of claim 1 wherein the particles have a mean particle size less than 50 nm.

10. The film-forming composition of claim 9 wherein the particles have a mean particle size less than 20 nm.

11. The film-forming composition of claim 1 wherein the particles are substantially spherical.

12. The film-forming composition of claim 1 wherein a cured composition comprising the crosslinking agent of (i) and the polymer of (ii) has a cured softening point of less than 0° C.

13. The film-forming composition of claim 12 wherein a cured composition comprising the crosslinking agent of (i) and the polymer of (ii) has a cured softening point of less than −20° C.

14. The film-forming composition of claim 1 wherein the particles are prepared by a process comprising: (a) introducing reactants into a reaction chamber; (b) rapidly heating the reactants by means of a plasma to a selected reaction temperature sufficient to yield a gaseous reaction product; (c) rapidly cooling the gaseous reaction product by passing the gaseous reaction product through a restrictive convergent-divergent nozzle or contacting the gaseous reaction product with a cool surface or quenching gas; and (d) condensing the gaseous reaction product to yield ultrafine solid particles.

15. The film-forming composition of claim 1 wherein the particles are prepared by a process comprising: (a) introducing a reactant stream into one axial end of a reaction chamber; (b) rapidly heating the reactant stream by means of a plasma to a selected reaction temperature as the reactant stream flows axially through the reaction chamber, yielding a gaseous reaction product; (c) passing the gaseous reaction product through a restrictive convergent-divergent nozzle arranged coaxially within the end of the reaction chamber to rapidly cool the gaseous reaction product adiabatically and isentropically as the gaseous reaction product flows through the nozzle, retaining a desired end product within the flowing gaseous stream; and (d) subsequently cooling and slowing the velocity of the desired end product exiting from the nozzle, yielding ultrafine solid particles.

16. The film-forming composition of claim 1, wherein the monomers used to prepare the polymer (ii) include an olefin selected from isobutylene and diisobutylene.

17. A coated substrate wherein the curable film-forming composition of claim 1 is applied to a substrate and cured to form a cured coating; the cured coating having a thickness of at least 5 microns.

* * * * *

UNITED STATES PATENT AND TRADEMARK OFFICE
CERTIFICATE OF CORRECTION

PATENT NO. : 6,770,705 B2
DATED : August 3, 2004
INVENTOR(S) : Noel R. Vanier et al.

It is certified that error appears in the above-identified patent and that said Letters Patent is hereby corrected as shown below:

Column 15,
Line 32, "weigh" should read -- weight --

Column 16,
Line 4, "nmax1" should read -- nmax, --.

Signed and Sealed this

Twenty-fourth Day of May, 2005

JON W. DUDAS
*Director of the United States Patent and Trademark Office*